United States Patent
Vannoni et al.

(10) Patent No.: US 11,245,724 B2
(45) Date of Patent: Feb. 8, 2022

(54) SPOOFED WEBPAGE DETECTION

(71) Applicant: PayPal, Inc., San Jose, CA (US)

(72) Inventors: Gregory Anthony Vannoni, Phoenix, AZ (US); Joshua Buck Powers, Chandler, AZ (US); Harsh Rajesh Vachhani, Scottsdale, AZ (US)

(73) Assignee: PayPal, Inc., San Jose, CA (US)

( * ) Notice: Subject to any disclaimer, the term of this patent is extended or adjusted under 35 U.S.C. 154(b) by 307 days.

(21) Appl. No.: 16/435,408

(22) Filed: Jun. 7, 2019

(65) Prior Publication Data

US 2020/0389493 A1 Dec. 10, 2020

(51) Int. Cl.
G06F 16/955 (2019.01)
H04L 29/06 (2006.01)
G06F 16/958 (2019.01)

(52) U.S. Cl.
CPC ...... *H04L 63/1483* (2013.01); *G06F 16/9566* (2019.01); *G06F 16/972* (2019.01)

(58) Field of Classification Search
CPC .................................................. H04L 63/1483
See application file for complete search history.

(56) References Cited

U.S. PATENT DOCUMENTS

| 7,492,957 | B1 * | 2/2009 | Bonhaus et al. | G06K 9/36 |
| 2007/0162961 | A1 * | 7/2007 | Tarrance et al. | H04L 9/32 |
| 2008/0066163 | A1 * | 3/2008 | Raheman | H04L 9/32 |
| 2017/0070517 | A1 * | 3/2017 | Bailey et al. | H04L 29/06 |

OTHER PUBLICATIONS

Ahmed Abbasi et al., A Comparsion of Tools for Detecting Fake Websites, 2009, IEEE, pp. 78-86 (Year: 2009).*

* cited by examiner

*Primary Examiner* — James J Debrow
(74) *Attorney, Agent, or Firm* — Haynes and Boone, LLP

(57) ABSTRACT

Methods and systems are provided to determine the legitimacy of a website. Such a website may include a graphical representation. The graphical representation may be periodically updated. A user device accessing the website may obtain data directed to the graphical representation at the time that the user device is accessing the website. The graphical representation may be compared to the data and legitimacy of the website may be determined through analysis of the graphical representation displayed on the website.

20 Claims, 11 Drawing Sheets

SPOOFED WEBPAGE DETECTION

BACKGROUND

Field of the Invention

The present invention generally relates to electronic fraud detection, and more particularly to detection of spoofed webpages.

Related Art

Theft of identity information through spoofed webpages is a persistent problem. Fraudsters have become increasingly sophisticated in how they spoof webpages. Oftentimes, spoofed webpages are indistinguishable to the naked eye as fraudsters utilize the same aesthetics and design as the real webpages that they are trying to spoof. Thus, detection of when a website is a spoof has become increasingly difficult.

Figure 1:
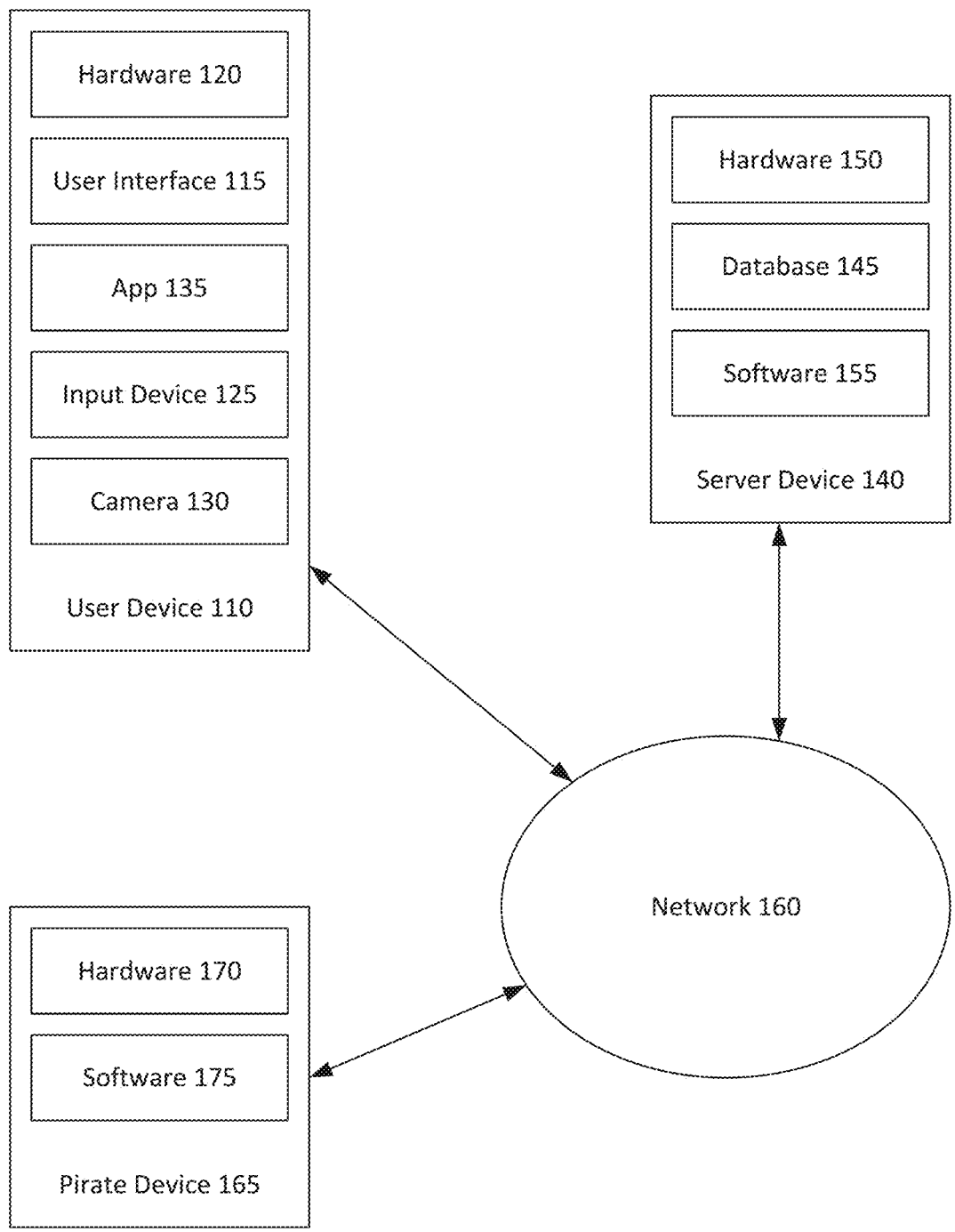
FIG. 1 is a schematic diagram showing a system according to an embodiment of the disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that allow for detection of when a webpage is spoofed. For example, a webpage can include a graphical representation, which can be any type of digital content or image, such as, but not limited to, a logo, a picture, an alphanumeric word or string, a color, or any combination thereof. The graphical representation can be periodically changed in a manner that is imperceptible to a user, but detectable by a user device. The user device or the entity that generated the graphical representation can then confirm the legitimacy of the webpage through analyzing the graphical representation. For example, in certain embodiments, a server device (e.g., a server device of a service provider maintaining or owning the webpage) may periodically generate or modify a graphical representation shown on a webpage, which enables the server device to send data to the user device for the user device to determine whether the webpage is fraudulent or to determine whether the webpage is fraudulent and send the determination to the user device.

In one embodiment, a user device may load a first webpage, capture an image of at least a portion of the first webpage that includes the graphical representation, and request data from the server device directed to the graphical representation. The server device may then determine whether the graphical representation was generated by the server device and provide such data to the user device. The data may include data indicating the configuration (e.g., location and values) of the pixels of an up to date graphical representation. After the user device receives the data, the user device may compare the data to the captured graphical representation to determine if the first webpage is legitimate or fraudulent.

In another embodiment, the user device may capture all or a portion of the website and provide the captured content to the server device. The server device may then analyze the captured content to determine whether the captured content includes is a graphical representation that corresponds or is associated with graphical representation the server device generated for the website. The server device may then compare the received graphical representation with what was generated to determine whether the website is fraudulent or not. The server device may then communicate the determination to the user device.

In a further embodiment, the user device may analyze the graphical representation. The analysis can result in a determination of a value and the user device can then analyze the Uniform Resource Locator (URL) of the webpage to determine if the URL matches that of the determined value. Based on how close the match is, the user device can determine whether the website is fraudulent or not.

FIG. 1 is a schematic diagram showing a system according to an embodiment of the disclosure. In certain embodiments, the system shown in FIG. 1 may include or implement one or more electronic devices such as mobile devices, desktop computers, servers, and/or software components that operate to perform various transactions or processes. It can be appreciated that the system illustrated in FIG. 1 may be deployed in other ways and that the operations performed and/or the services provided by the electronic devices described herein may be combined or separated for a given implementation and may be performed by a greater number or fewer number of devices.

The system of FIG. 1 may include a user device 110, a server device 140, and a pirate device 165. The devices of the system may communicate with one or more other devices over a network 160. In certain embodiments, user device 110 may access a website purported to be maintained by server device 140. The website may actually be maintained by server device 140 or may be a spoofed website maintained by pirate device 165.

Server device 140 may be maintained by or associated with a payment provider, a merchant, or another service provider. Server device 140 may be configured to create and/or modify one or more webpages and/or graphical representations of webpages. In certain embodiments, server device 140 may be integrated into one or more servers. Such servers may additionally be configured to perform other operations, such as payment or transaction processing. Thus, server device 140 may be maintained by a service provider, such as PayPal®, Inc. of San Jose, Calif. Such servers may also include one or more databases storing data (e.g., historical transactions or device data) related to the generated or modified webpages and/or graphical representations.

A user may utilize user device 110 to load a webpage. The webpage may be generated by server device 140 or may be a spoofed webpage generated by pirate device 165. The user may utilize user device 110 to load the webpage in order to log in to an account of the user to conduct a transaction. "Transaction," as used herein, refers to any suitable action performed using electronic devices, including product or service purchases, payments, transfer of information, display of information, etc.

User device 110, server device 140, and pirate device 165 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to the devices and/or accessible over network 160. Network 160 may be implemented as a single network or a combination of multiple networks. For example, in various embodiments, network 160 may include the Internet and/or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as an augmented reality (AR) device, a personal computer (PC), a smart phone, a laptop computer, a tablet, a wearable computing device, and/or other types of computing devices that includes hardware 120, including processors, memory, screens, speakers, and other hardware devices, capable of processing, transmitting, and/or receiving data. User device 110 may also include an input device 125 and a user interface 115 that may include components (e.g., touch screens, a mouse, a keyboard, and other input device) that may receive user inputs, provide outputs to the user, and/or otherwise operate user device 110.

User device 110 may additionally include one or more cameras 130. Camera 130 may be configured to capture images and/or videos outside or on user device 110. For example, a user may operate user device 110 and have camera 130 capture images of a webpage. Data from camera 130 may be provided to hardware 120. User device 110 may additionally include one or more applications 135 which may be used, for example, to provide an interface for the user to browse information available over network 160. Apps 135 may be implemented, for example, using a browser, a browser plug-in, a program, and/or another type of application. Camera 130 and/or apps 135 may capture an image of a webpage, capture a screenshot of what is shown on user interface 115, and/or may obtain metadata directed to a webpage. Such data may be provided to hardware 120. In certain embodiments, hardware 120 may analyze the data captured by camera 130 and/or apps 135, but other embodiments may provide the data to server device 140. Furthermore, hardware 120 may receive data from server device 140 directed to the webpage and/or the graphical representation for use in analyzing the webpage and/or the graphical representation.

Apps 135 may further include other applications to perform other functions or provide other features for user device 110. For example, apps 135 may include security applications for implementing client-side security features, programmatic client applications for interfacing with appropriate application programming interfaces (APIs) over network 160, or other types of applications. Apps 135 may also include applications that enable the user to communicate, transfer information, make payments, and otherwise conduct transactions through the service provider as discussed above.

In certain embodiments, various APIs of various devices (e.g., user device 110 or server device 140) may allow for operation of camera 130, operation of apps 135, communication with other devices (e.g., server device 140), storage, lookup, and management of data, calculation of values, analysis of images (e.g., to identify a graphical representation in an image), normalization of colors of an image, determination of whether a graphical representation indicates a legitimate or fraudulent website, and/or other operations. Such APIs may be implemented as one application or may be a combination of APIs from multiple applications. As such, APIs may be used to allow for programs that perform the techniques described herein.

Server device 140 may be maintained, for example, by a merchant or service provider offering various products and/or services (e.g., transaction or payment processing services). Server device 140 may include hardware 150, which may be similar to hardware 120 of user device 110 and configured to allow operation (e.g., by providing processing resources, cooling, and/or other performing other operations) of server device 140.

Server device 140 may also include a database 145 that stores data associated with webpages, graphical representations, and/or other data directed to webpages. In certain embodiments, the webpages may be maintained by the service provider. Such data may include historical data directed to a plurality of graphical representations generated by the service provider. Database 145 may also include data identifying one or more associated parties that are allowed to use services provided by the service provider. Such associated parties may, for example, be allowed to use payment processing applications of the service provider (e.g., may link and/or otherwise generate webpages that incorporate log-ins to accounts maintained by the service provider for a customer to pay for products and/or services). Database 145 may flag associated parties that are suspected of spoofing the service provider's webpages and/or graphical representations and may ban such associated parties from using the services of the service provider.

Server device 140 may also include software 155. In various embodiments, software 155 may access historical data directed to the webpages and/or the graphical representations and provide such data to user device 110. In other embodiments, software 155 may receive data directed to a webpage and/or a graphical representation and determine if the webpage is fraudulent based on the data received.

Pirate device 165 may be operated by a fraudster to generate and obtain data from spoofed webpages. The webpage may spoof a webpage associated with the service provider. As such, pirate device 165 may include similar components (e.g., hardware 170 and software 175) to that of other devices described herein.

Figure 2:
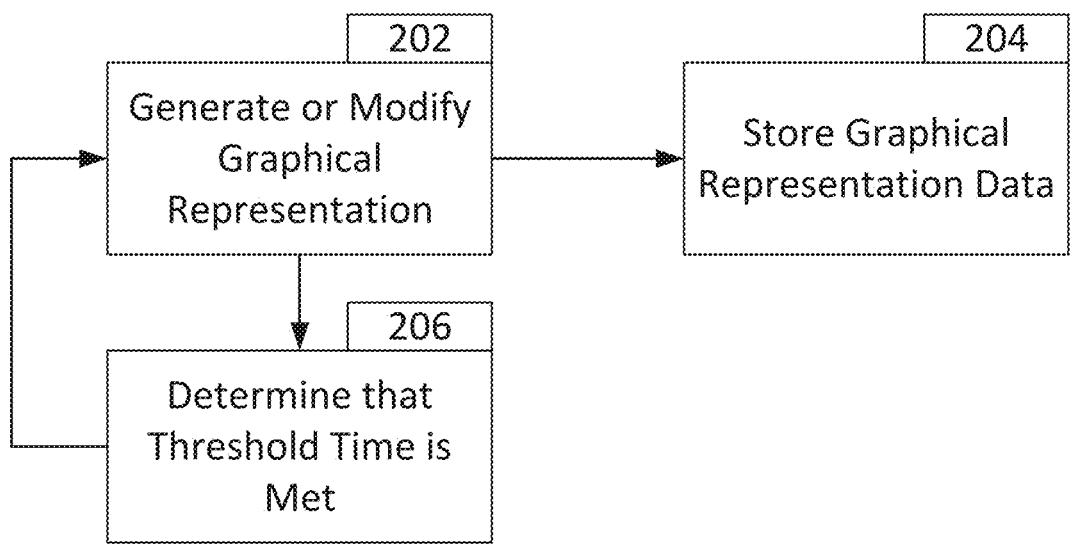
FIG. 2 is a flowchart showing an example of operations of generating or modifying a graphical representation according to an embodiment of the disclosure.

FIG. 2 is a flowchart showing an example of operations of generating or modifying a graphical representation according to an embodiment of the disclosure. The technique described in FIG. 2 may be performed by server device 140 to create or modify webpages that allow for the detection of spoofed webpages pretending to be legitimate webpages.

In block 202, a graphical presentation may be generated or modified. The graphical representation may be generated or modified as part of the generation or modification of a webpage that includes the graphical representation or may be generated or modified by itself and then inserted into the webpage. As described herein, a graphical representation may be a pixel or a collection of pixels (such as a logo or a picture). The graphical representation may be viewable to a user viewing the webpage. Server device 140 may periodically alter the graphical representation. Such changes to the graphical representation may, in certain embodiments, not be perceptible to a human viewer, but may be detectable by an electronic device.

In block 204, data directed to the graphical representation may be stored within database 145 of server device 140. As the graphical representation may be periodically changed, server device 140 may store data for a plurality of versions of the graphical representation. The data may be accordingly timestamped to allow for identification. Such data may include data indicating any changes to the graphical representation.

In block 206, the server device may determine if a threshold time or other condition (e.g., when fraud has been detected by other users) has been met. If the threshold time or other condition has been met, the technique may return to block 202 and the server device may further update or change the graphical representation. If the threshold time or other condition has not been met, the graphical representation may be kept the same. As such, the graphical representation may be periodically updated by the server device.

In certain embodiments, the server device may include a list of changes that are cycled through for the graphical representation. As such, the graphical representation may be changed according to a schedule. In other embodiments, the changes of the graphical representation may be random. Such random changes may be within one or more parameters, such as when high activity is detected or expected on the website, when fraudulent activity is detected on the website, and other factors that indicate a higher or lower likelihood of the website being spoofed. For example, a pixel of the graphical representation may be randomly moved within a set number of positions within the graphical representation.

Figure 3:
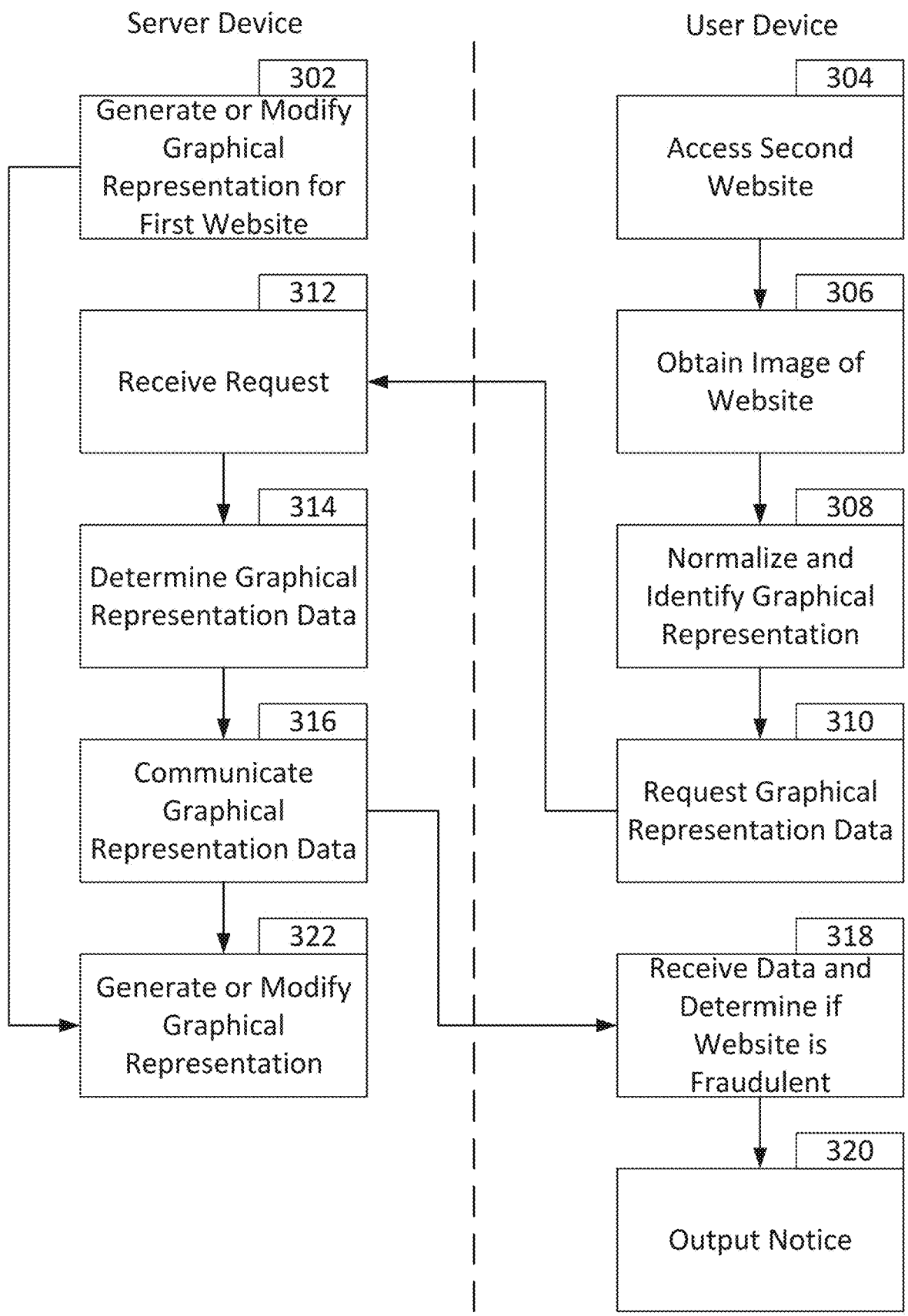
FIG. 3 is a flowchart showing an example of operations of determining a spoofed website according to an embodiment of the disclosure.
Figure 4:
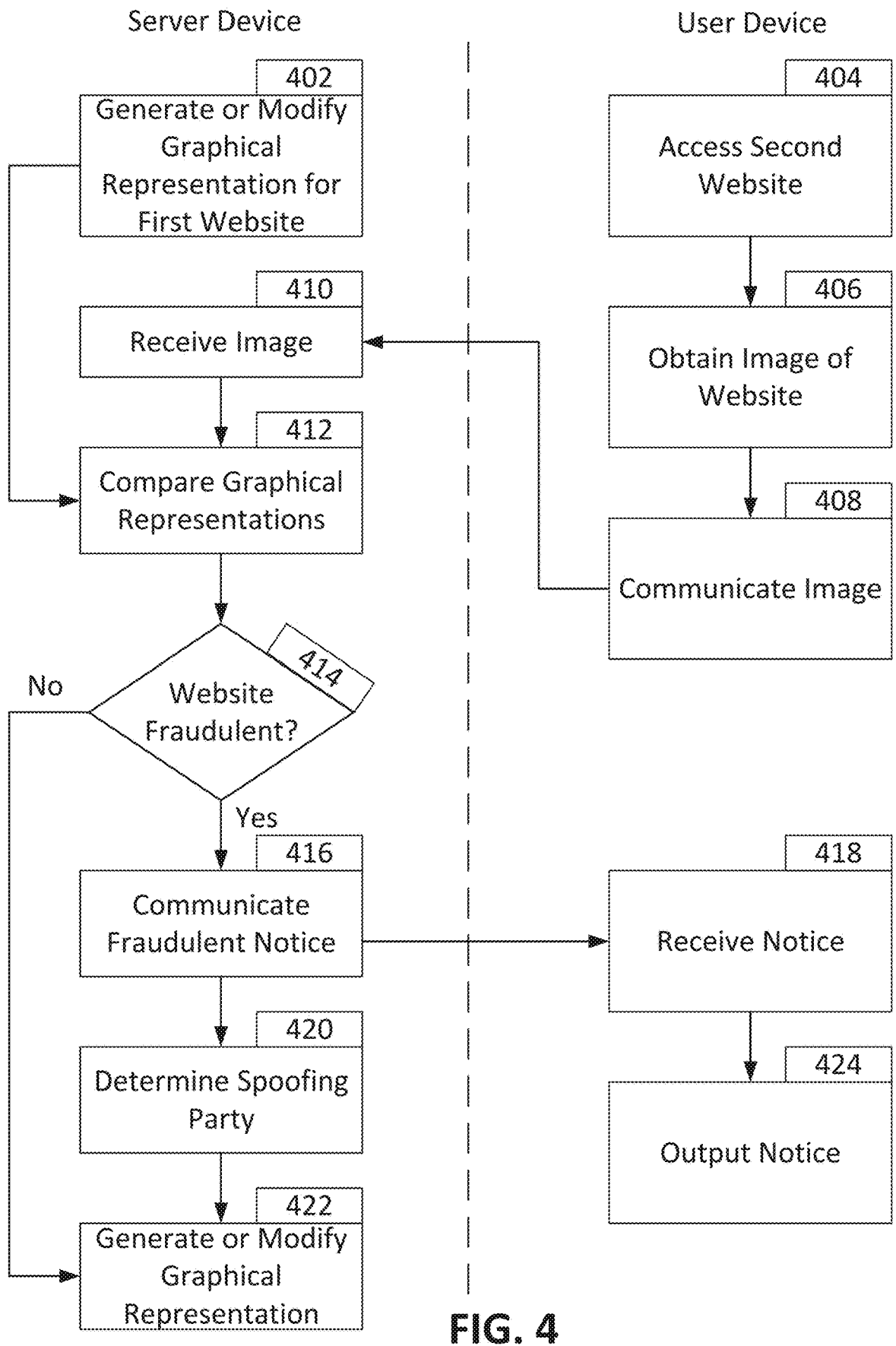
FIG. 4 is a flowchart showing another example of operations of determining a spoofed website according to an embodiment of the disclosure.

The periodically or randomly generated or modified graphical representation may be used to detect spoofed webpages. FIGS. 3 and 4 illustrate techniques used to detect spoofed webpages with graphical representations. FIGS. 3 and 4 illustrate techniques performed by a combination of a user device and a server device. Steps performed by the server device are illustrated on the left side of FIGS. 3 and 4. Steps performed by the user device are illustrated on the right side of FIGS. 3 and 4.

FIG. 3 is a flowchart showing an example of operations of determining a spoofed website according to an embodiment of the disclosure. In block 302, a first webpage associated with a service provider or a graphical representation for the first webpage may be generated or modified as described herein. Meanwhile, a user device accesses a second webpage in block 304. The second webpage may be the first webpage or may be a spoof of a webpage of the service provider. The second webpage may request that the user enter sensitive information, such as log-in information, funding source information or personal data, such as date of birth, social security number, and answers to security questions, or conduct a transaction through the second webpage.

In block 306, an image of the second webpage may be obtained. The image may be obtained through a browser plug-in taking a screenshot, through a camera (e.g., of a mobile device or an AR device) taking a picture of the webpage, through an app obtaining metadata associated with the webpage, or through another technique. The image of the second webpage may include data directed to the graphical representation as well as additional data (e.g., that of the URL of the webpage and/or a color palette or other item to normalize the image of the webpage). In certain embodiments, from such data, the pixel values and/or positions of the graphical representation may be determined.

In certain embodiments, the mobile device may analyze the image and determine if the graphical representation captured within the image is suitable for authenticating the webpage. Thus, the mobile device may determine if the image is too blurry or if the graphical representation is partially obscured. If so, the mobile device may request that the user obtain a better quality image. In certain other embodiments, the server device may also perform such analysis.

In block 308, the user device may determine the graphical representation within the image and/or determine the metadata associated with the graphical representation. In certain such embodiments, such as when a color palette is also captured, the pixel values of the image may be normalized. Normalizing of the pixel values may allow for an accurate determination of whether the graphical representation is that of a proper webpage or a spoofed/fraudulent webpage and is further described herein.

The user device may request data directed to the graphical representation in block 310. In certain embodiments, the user device may additionally determine a time that the image or metadata of the second webpage was obtained. The user device may then request the data associated with such a time from the server device. While certain embodiments may request such data only when a graphical representation is determined to be present on a website, other embodiments may maintain a constant connection through, for example, socket or streaming, and obtain data from the server device through the constant connection. In such embodiments, the data directed to the graphical representation may be streamed to the user device as the graphical representations change, allowing for up to the minute, up to second, or real time updates to the graphical representation.

The server device may receive the request in block 312. The server device may then determine the data associated with the graphical representation during the appropriate timeframe (e.g., for the timeframe that contains the time that the image was obtained) in block 314. In certain embodiments, such data may include pixel values (e.g., of the shade or color of the pixel) of one or more pixels of the graphical representation (e.g., of the entire graphical representation or a section of the graphical representation that is periodically changed), the positioning of the graphical representation relative to other parts of the first webpage, positions of pixels of certain values within the graphical representation, and/or data directed to how to analyze the graphical representation. The server device may then communicate such data to the user device in block 316. Additionally, the server device may determine if conditions are met to update the graphical representation or generate a new graphical representation. If they are met, the graphical representation may be updated or a new graphical representation generated in block 322.

The user device may receive the data in block 318. Once received, the user device may determine if the second webpage is fraudulent from the data. For example, the user device may analyze the graphical representation and determine the pixel values and/or positions of the graphical representation. The user device may utilize the normalized graphical representation for such analysis. If the pixel values and/or positions match (within a certain threshold, which can be 100% or a lesser number, such as 95%, which may depend on the size or type of the graphical representation) that of the data provided by the server device, the user device may determine that the second webpage is legitimate. Otherwise, the user device may determine that the second webpage is fraudulent.

In certain embodiments, the user device may execute a cyclic redundancy check (CRC) or another transform of the graphical representation. Such a technique may allow the user device to determine a value or other output associated with the graphical representation. The user device may then compare such an output to an output contained within the data to determine if the second webpage is fraudulent. In certain additional embodiments, such techniques may not require the user device to receive data from the server device. Instead, the output may be hidden within the URL of the first webpage or on the first webpage and the user device may determine if the output is shown within the URL of the second webpage or on the second webpage to determine if the second webpage is legitimate.

If the user device determines that the second webpage is fraudulent, the user device may then output a notice to warn the user that the second webpage is fraudulent. In certain embodiments, the notice may be visual warning (e.g., displayed on a screen of the user device), an audible warning, redirection away from the second webpage, or another such warning to communicate to the user that the second webpage is fraudulent.

FIG. 4 is a flowchart showing another example of operations of determining a spoofed website according to an embodiment of the disclosure. In block 402, a graphical representation and/or a first website is generated and/or modified. Block 402 may be similar to block 302 of FIG. 3 described herein. Similarly, a user device may access a second website in block 404 similar to block 304 and obtain an image of the second website and/or a graphical representation shown on the second website in block 406 similar to block 306. In other embodiments, metadata associated with the second website may, additionally or alternatively, be obtained.

In block 408, the data directed to the image of the second website and/or of the graphical representation (as well as any metadata associated with the second website) may be communicated to the server device. The server device may receive the data in block 410.

In block 412, the received data or image may be compared to data or an image stored by the server device that corresponds to the second website. For example, the server device may first determine whether the received image corresponds to a website the server device generated a graphical representation for, such as through image processing. If there are sufficient similarities, the server device accesses or retrieves data associated the graphical representation(s) generated or updated for the website. The server device may then identify any corresponding graphical representation shown within the images received or may identify portions of the metadata directed to the graphical representation. The server device may then identify the relevant historical data (e.g., the historical data directed to the graphical representation that matches the time that the image or data was obtained). In certain embodiments, the server device may identify a plurality of sets of historical data (e.g., data one cycle before and/or after the identified time) to prevent any false negatives due to, for example, mismatches between timestamps.

The graphical representation may then be analyzed by, for example, comparing one or more relevant pixels of the graphical representation of the second website to that of the relevant stored data. The position, pixel value, or another aspect of the graphical representation may be compared in block 412. Comparison techniques may be further described herein.

In certain embodiments, instead of the user device communicating an image of the website and/or graphical representation, the user device may simply communicate the URL of the second website. The server device may then accordingly access the URL to determine if the second website is fraudulent (e.g., through analysis of the graphical representation displayed on the second web site). Such an embodiment may, instead of accessing a previously stored version of data directed to the graphical representation and comparing such data to the image or other data communicated by the user device, simply access the URL of the second website and compare the graphical representations shown within the second website to the current graphical representation data.

In block 414, the server device may determine if the second website is fraudulent based on the comparison in block 412. If the server device determines that the second website is not fraudulent (e.g., due to the graphical representation of the second website indicating that the second website is legitimate), the server device then either communicates a notice that the website is legitimate or takes no action (in which case the user device may simply not provide a notice that the website is fraudulent). The server device then continues to generate and/or modify the graphical representation and/or the websites in block 422, based on the website being legitimate.

However, if the server device determines that the second website is fraudulent in block 414, the server device may then generate and communicate a notice indicating that the second website is fraudulent in block 416. The user device may receive the notice in block 418 and determine that the notice indicates that the second website is fraudulent. The user device may then output a notice indicating that the second website is fraudulent in block 424. In certain embodiments, block 424 may be similar to block 320.

Furthermore, if the server device determines that the second website is fraudulent, the server device may determine the party creating and/or associated with the fraudulent website in block 420. In certain situations, such a party may be a party associated with the service provider, such as a party allowed to use the services of the service provider. An example of such a party may be, for example, a merchant using the services of PayPal®. The server device then continues to generate and/or modify the graphical representation and/or the websites in block 422, based on the website being fraudulent, which may result in immediate or higher frequency modifications.

Accordingly, the server device may, for example, determine whether the graphical representation displayed on the second website matches that of a graphical representation created for a certain time period. The server device may then determine a list of associated parties with access to the services of the service provider and, accordingly, permission to display the graphical representation during the time period. The server device may then determine the identity of the party associated with the second website.

In certain embodiments, the server device may generate unique websites for each user device (e.g., for each unique Internet Protocol address or related address or identifying information). Thus, the server device may change the graphical representation in manners unique to each user device (e.g., each user device may include their own change schedule or types of changes). Accordingly, the server device may, when the graphical representation is determined to indicate a fraudulent website, isolate the impact of the fraud to a single user device and, additionally, allow for simplified determination of the party associated with the second website as the affected user device is already identified.

In certain embodiments, a user may conduct transactions with merchants through token-based authentication such as via Open Authorization (OAuth) token-based authentication. The server device may thus issue tokens for use with the user. The list of merchants that the user was issued tokens for can be compared. In certain embodiments, for example, the server device may determine a list of possible merchants that the user (e.g., through a token that can be shared between a plurality of user devices) or the user device was issued a token for and cross reference suspicious activities from other users (e.g., through matching of merchant identities suspected of being fraudulent from other users) to determine the identity of the merchant. In other embodiments, the timeframe that the user conducted past transactions with merchants may be stored. The server device may then determine that the graphical representation of the second website matches a time when the user had previously conducted a transaction with the merchant. The merchant identity may then accordingly be determined. In certain other embodiments, the token may be registered for use with only a specific merchant. The merchant associated with the specific token may be identified through a registry listing the tokens and their associated merchants. Thus may determine that the party associated with the second website is that merchant. In certain embodiments, where the user device communicates the URL of the second website, the identity of the merchant may already be known (e.g., from the URL itself or from the website registry).

After the merchant identity has been determined, in certain embodiments, the service provider may then ban the merchant from using the services of the service provider. Certain embodiments may require a set threshold number of offenses before banning of the merchant.

Figure 5:
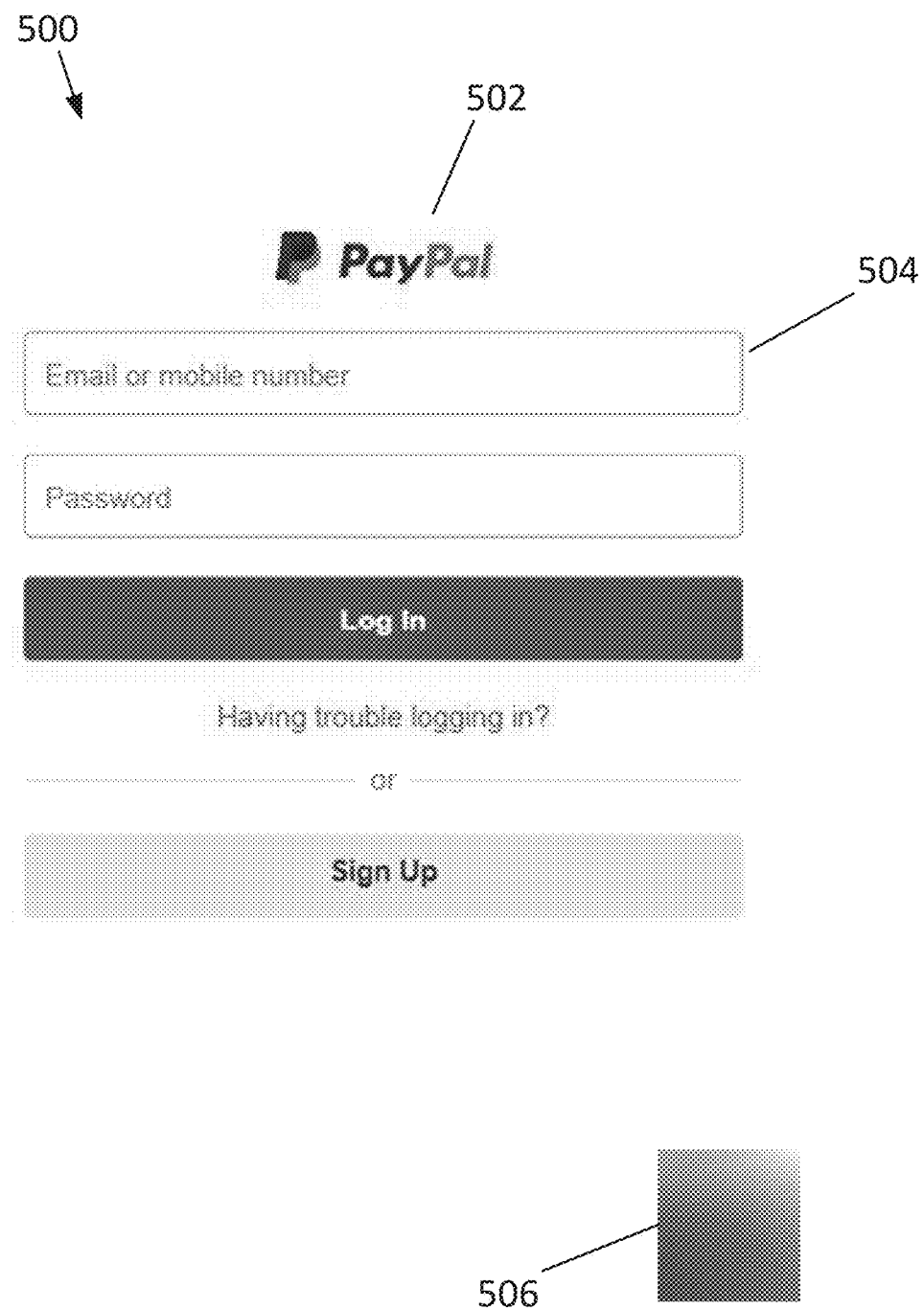
FIG. 5 is a log-in webpage with a graphical representation according to an embodiment of the disclosure.

FIG. 5 is a log-in webpage with a graphical representation according to an embodiment of the disclosure. FIG. 5 illustrates a log-in website 500 with a service provider logo 502, a log-in information section 504, and a color palette 506. The log-in information section 504 may be an area of the webpage where a user enters their e-mail, username, phone number, or other identifying information as well as a password, passcode, or other authenticating information.

Logo 502 may be a graphical representation. Such a graphical representation may be a logo of the service provider, a trademark of the service provider, text, a picture, or another such collection of pixels. For the purposes of this disclosure, "graphical representation" may be any collection of pixels from which legitimacy of the website can be determined.

Color palette 506 may be used to normalize the values of pixels displayed. Color palette 506 may be a swatch of colors with known pixel values (e.g., known and stored within the user device or known and stored by the server device). The pixels of color palette 506 may be constant and may only be infrequently updated. As shown, a user device and/or a server device may utilize color palette 506 to normalize the pixels displayed by the website or on a captured image of the website by, for example, adjusting the color (e.g., the pixel value directed to the tone or color value) of the captured image of the website until color palette 506 exactly matches that of the known values or comes within a certain threshold of matching, such as 99% or another number, which can be based on resolution of the image (both captured and stored), size of the image (both captured and stored), etc. For example if the captured image is of fairly low resolution, such as due to an older camera, the threshold may not need to be at 100%, but can be at a lower number, such as 95%.

In certain embodiments, color palette 506 may be used to calibrate an electronic device displaying the log-in website 500. Accordingly, the colors shown on the display of the electronic device may be adjusted with the color palette 506 by, for example, the user device obtaining an image showing color palette 506 and then communicating with the electronic device until the display of the electronic device shows color palette 506 with colors matching that of the base pixel values. In certain embodiments, the user device may also determine a brand and/or model of the electronic device. The user device may then accordingly normalize the image and/or communicate with the electronic device to normalize the display based on inherent characteristics of the electronic device (e.g., certain electronic devices may be known to display a more reddish tint and such a tint may be canceled during the normalization process).

Furthermore, the user device (e.g., through communication with the electronic device and/or through analysis of the image obtained) and/or the electronic device itself may also determine whether the electronic device is in one or more modes (e.g., a bedtime mode). In certain such modes, the colors shown on the display of the electronic device may be changed according to the mode. In other embodiments, the image may be normalized based on the detected mode. Thus, the effects of the different modes of an electronic device may be canceled to obtain a normalized image.

Figure 6:
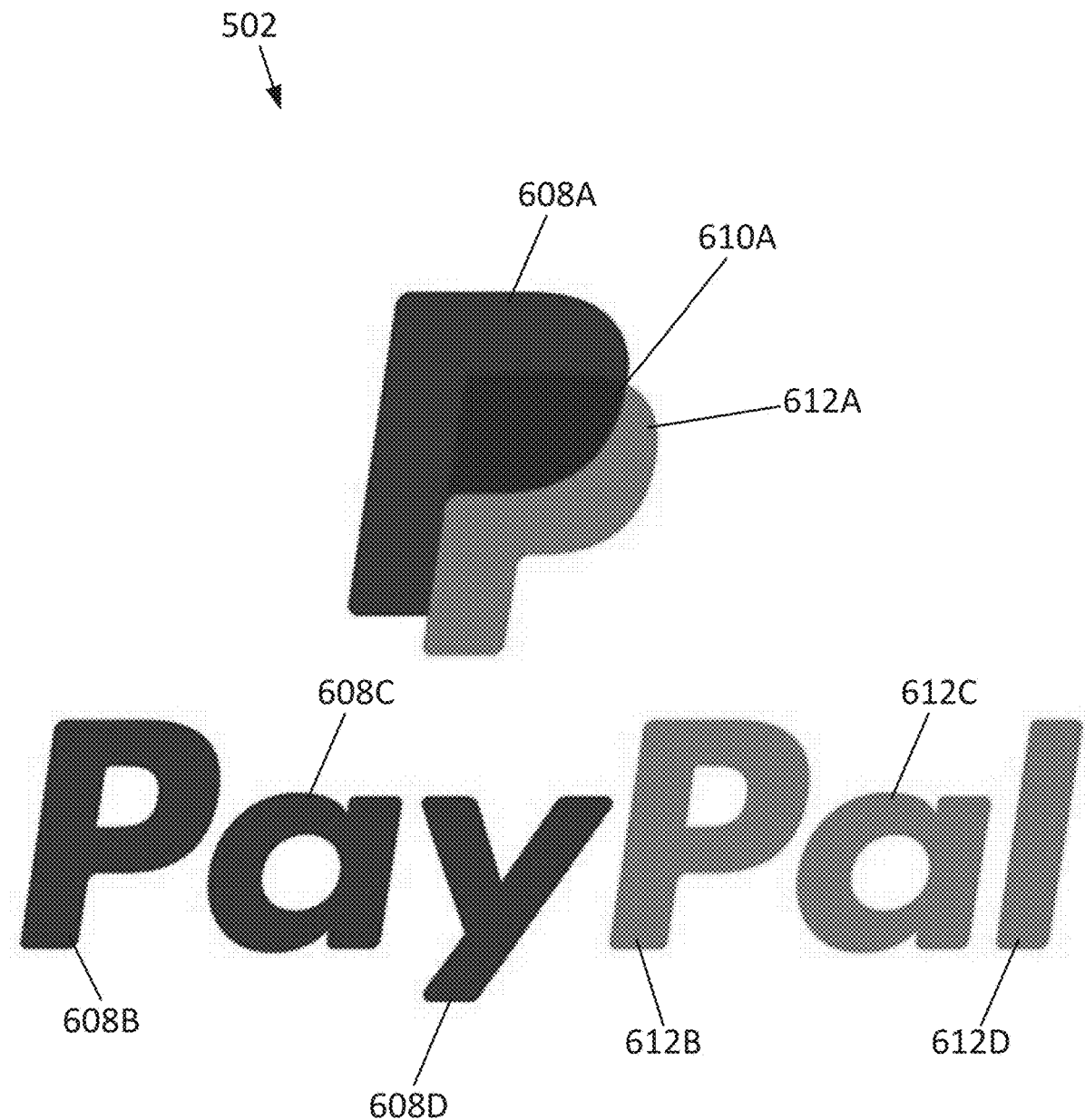
FIG. 6 is an example of a graphical representation according to an embodiment of the disclosure.

FIG. 6 is an example of a graphical representation according to an embodiment of the disclosure. FIG. 6 illustrates logo 502 that is a graphical representation. Though logo 502 is a logo of PayPal®, other embodiments may use another collection of pixels or any other element of a log-in webpage or other webpage.

Logo 502 includes sections 608A-D, 610A, and 612A-D. Sections 608A-D may have ostensibly the same color as viewed by a user. Similarly, sections 612A-D may be sections with the same color as viewed by the user, but may be different in color from sections 608A-D. Section 610A may be a section with a color different from that of sections 608A-D to 612A-D.

In certain embodiments, the shade of one or more of sections 608A-D, 610A, and 612A-D may be modified or varied from the base value (e.g., the base value of the pixels of the logo) using techniques described herein. The variation in the shade may be only perceptible to an electronic device; the human eye may view the shades as the same color. The pixel value of a black and white section or one or more of the red green blue (RGB) values may thus only be varied within a small range (e.g., within values of 3, 5, 10, 20, or other range from that of the base value). In certain such embodiments, the shade of the sections may only be varied within an amount that keeps the shade within the same Pantone shade.

Certain techniques may vary the shade of only one section (e.g., may only vary section 608A) while other techniques may vary the shade of all sections of the same shade (e.g., may vary all of sections 608A-D) or vary all of the sections of the graphical representation (e.g., may vary sections 608A-D, 610A, and 612A-D). One, some, or all of the sections may be varied randomly, or as needed. Accordingly, variation of the shades of the sections may be difficult to predict and spoof.

Figure 7A:
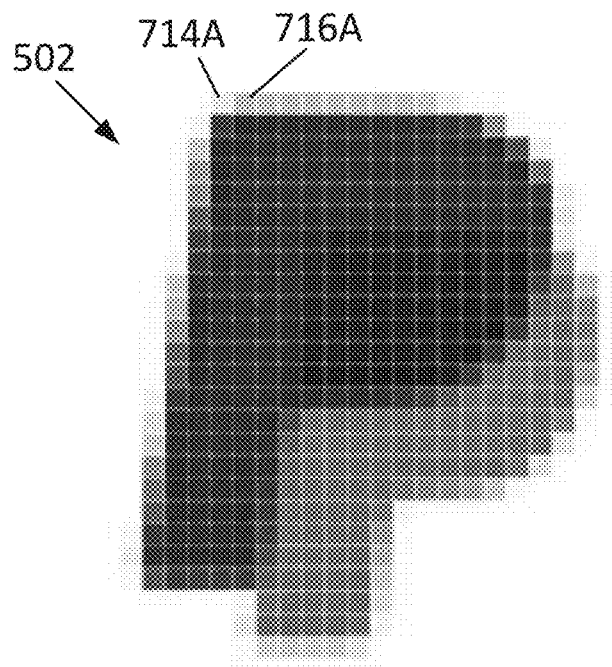
FIGS. 7A and 7B are examples of different graphical representations according to embodiments of the disclosure.
Figure 7B:
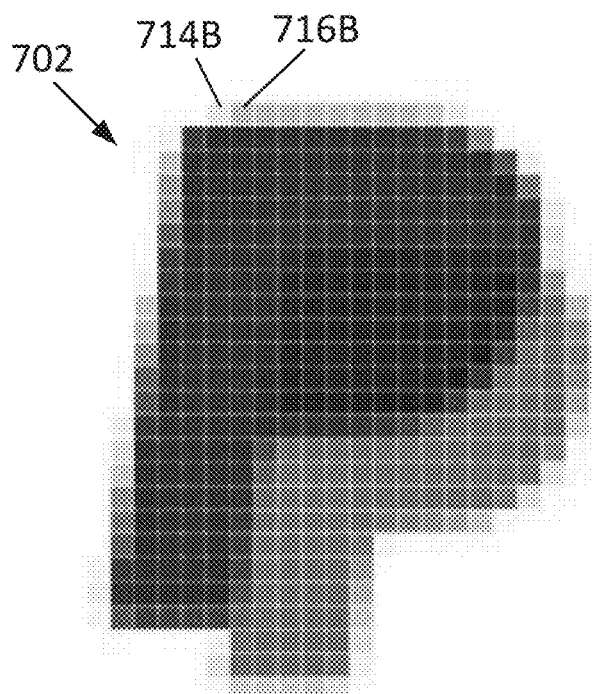

FIGS. 7A and 7B are examples of different graphical representations according to embodiments of the disclosure. FIGS. 7A and 7B illustrate graphical representations with sections 608A, 610A, and 612A shown in FIG. 6. FIG. 7A illustrates a graphical representation 502 with all pixel values at base values. For example, pixels 714A and 716A may be pixels at base values. FIG. 7B illustrates a graphical representation 702 with pixels values that are different than the base values. Graphical representations 502 and 702 may be graphical representations of the same size (e.g., with the same number of pixels).

In certain embodiments, the server device may change the pixel values of one or more of pixels of the graphical representation 502 of FIG. 7A to create graphical representation 702 of FIG. 7B. When the user device and/or the server device obtains an image of a graphical representation shown on a second website, the user device and/or the server device may determine that graphical representation 702 matches that of the time the image was obtained and compare the values of one or more pixels of the graphical representation of the second website to graphical representation 702 to determine the validity of the second website.

FIG. 7B illustrates graphical representation 702 where the positions of pixels 714A and 716A have been shifted leftward by one pixel. As such pixels 714B and 716B of graphical representation 702 are the same values as pixels 714A and 716A, respectively, but are in different positions. In other embodiments, one or more pixels may be shifted by more than one pixel and/or may be shifted in another direction. The shift of one pixel may not be noticeable to a user, but may be detectable by an electronic device or an AR device.

The pixels of graphical representation 702 may also be considered to have an adjusted value. For example, the pixel of graphical representation 702 corresponding to pixel 714A may be adjusted to be a white pixel. Meanwhile, pixel 714B may be adjusted from the value of pixel 716A to that of the value of pixel 714A.

Figure 8:
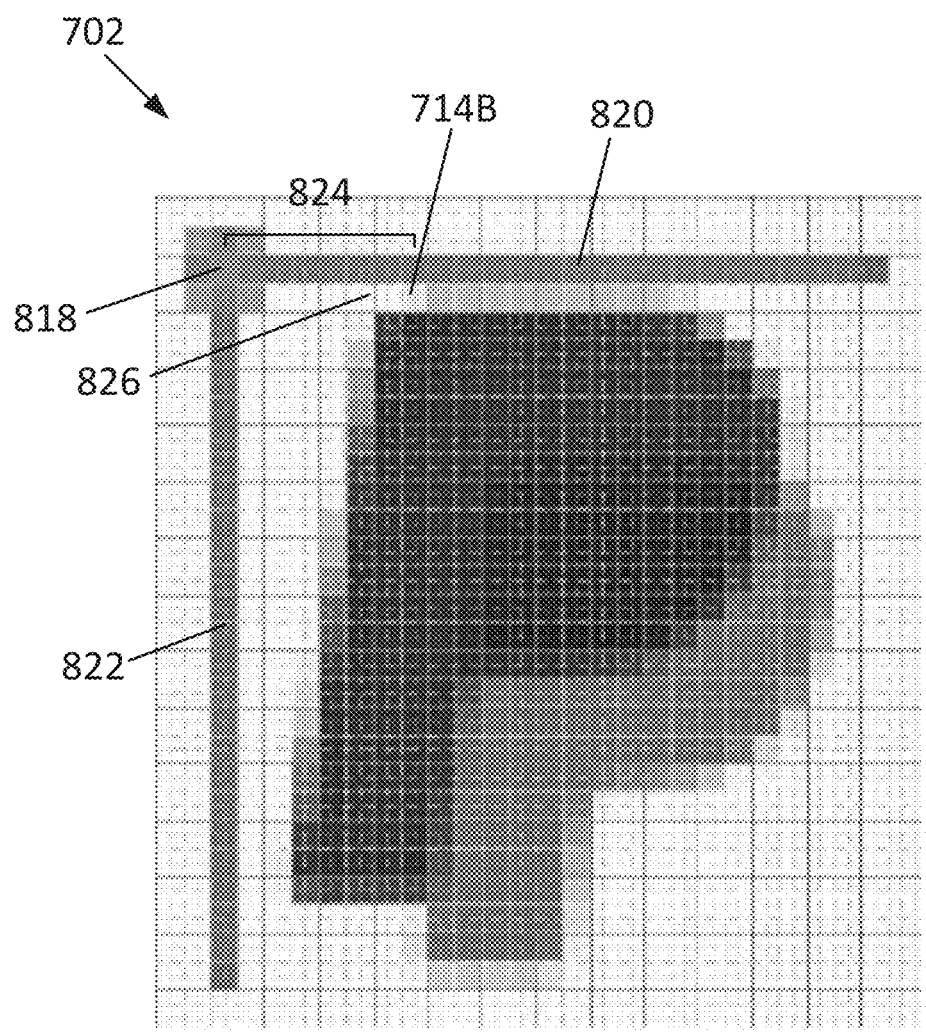
FIG. 8 is a pixel-by-pixel illustration of a graphical representation according to an embodiment of the disclosure.

FIG. 8 is a pixel-by-pixel illustration of a graphical representation according to an embodiment of the disclosure. FIG. 8 illustrates a graphical representation similar to that of the graphical representations shown in FIGS. 7A and 7B. FIG. 8 illustrates graphical representation 702. As shown, graphical representation 702 includes an origin reference point 818. The pixel location may be calculated from axes 820 and 822 as a value with two numbers. For example, pixel 714B may be a horizontal (x) distance 824 from an origin reference point 818 and a vertical (y) distance 826 from origin reference point 818. During analysis of the graphical representation, the server device and/or the user device may determine the location of all graphical representations from origin reference point 818. Thus, in the example of FIGS. 7A and 7B, the server device and/or the user device may determine that pixel 714B has shifted by one pixel from origin reference point 818, resulting in a shift of a horizontal distance 824.

Figure 9:
FIG. 9 is another log-in webpage with a graphical representation according to an embodiment of the disclosure.
Figure 9:
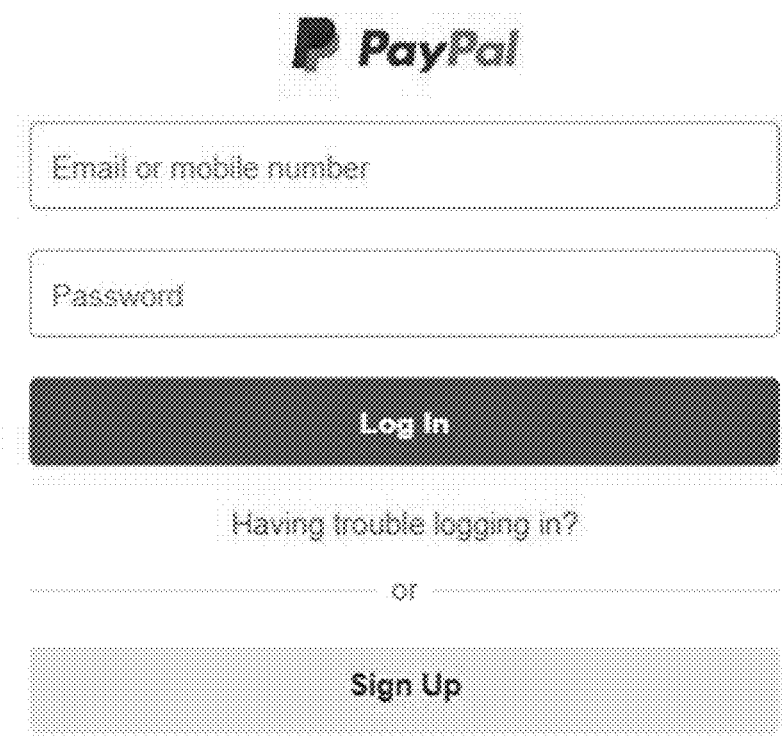

FIG. 9 is another log-in webpage with a graphical representation according to an embodiment of the disclosure. In FIG. 9, an electronic device may determine a transform value from the pixel values and/or the locations of pixels within the graphical representation. Such a value may be determined from an image of the website and/or may be determined through metadata.

For example, the electronic device may perform a CRC transform of any pixel shifts of the graphical representation. Using the example of FIGS. 7A and 7B, the electronic device may determine that certain pixels of the top row of graphical representation 702 has been shifted leftward by one pixel. The electronic device may then populate a matrix indicating the pixel shift:

[0, 0, 0, 0, 0, 0, 0, 1, 1, 1, 1, 1, 1, 1, 0, 0, 0, 0, 0, 0, 0, 0],
[0, 0, 0, 0, 0, 0, 0, 0, 0, 0, 0, 0, 0, 0, 0, 0, 0, 0, 0, 0, 0, 0],
[0, 0, 0, 0, 0, 0, 0, 0, 0, 0, 0, 0, 0, 0, 0, 0, 0, 0, 0, 0, 0, 0],
[0, 0, 0, 0, 0, 0, 0, 0, 0, 0, 0, 0, 0, 0, 0, 0, 0, 0, 0, 0, 0, 0],
[0, 0, 0, 0, 0, 0, 0, 0, 0, 0, 0, 0, 0, 0, 0, 0, 0, 0, 0, 0, 0, 0]

A CRC32 value may then be calculated from the matrix. The electronic device may then compare the calculated value to stored data or data associated with a legitimate website to determine if the website is legitimate.

In certain embodiments, the electronic device may receive data from the server device indicating the CRC32 value of a legitimate website. In other embodiments, the URL or the website may be updated with the actual CRC32 value. Thus, if the electronic device does not detect the CRC32 value within the URL or on the website (e.g., within a captured image or within the metadata), the electronic device may determine that the website is fraudulent. For example, in FIG. 9, a URL 928 may display the CRC32 value and the website may include a section 930 that displays the CRC32 value. The electronic device may thus verify the legitimacy of the website by comparing the calculated CRC32 value to the values within URL 928 or displayed in section 930. In certain embodiments, if the electronic device is unable to read the full URL, the electronic device may display a message requesting that the user capture another image that displays more or all of the URL. Other embodiments may obtain the value through metadata.

Figure 10A:
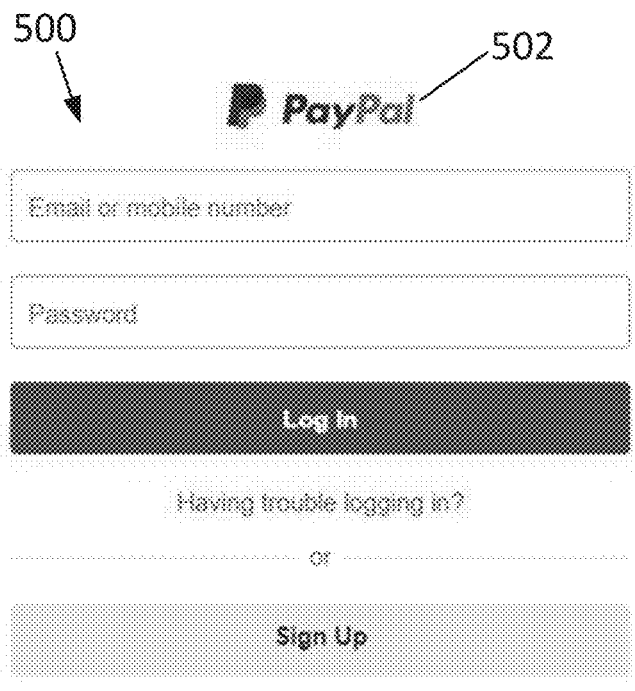
FIGS. 10A and 10B are further log-in webpages with graphical representations according to embodiments of the disclosure.
Figure 10B:
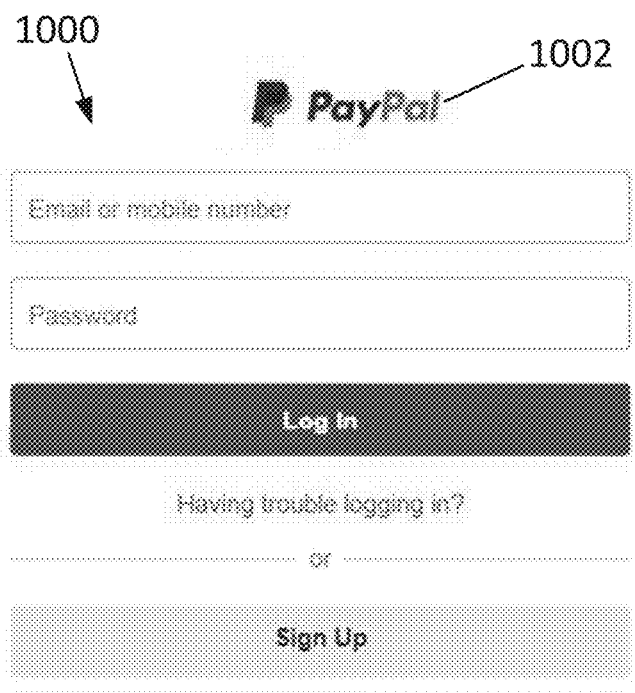

FIGS. 10A and 10B are further log-in webpages with graphical representations according to embodiments of the disclosure. FIG. 10A illustrates a website with graphical representation 502 in a first position. FIG. 10B illustrates a website with a graphical representation 1002 in a second position. The second position may be different from the first position. The position of the graphical representation may be periodically moved. An electronic device may determine the legitimacy of a website by comparing the position of the graphical representation. If the position of the graphical representation does not match that of the position for the appropriate timeframe (and within a certain or predetermined threshold), the website may be determined to be fraudulent.

Figure 11:
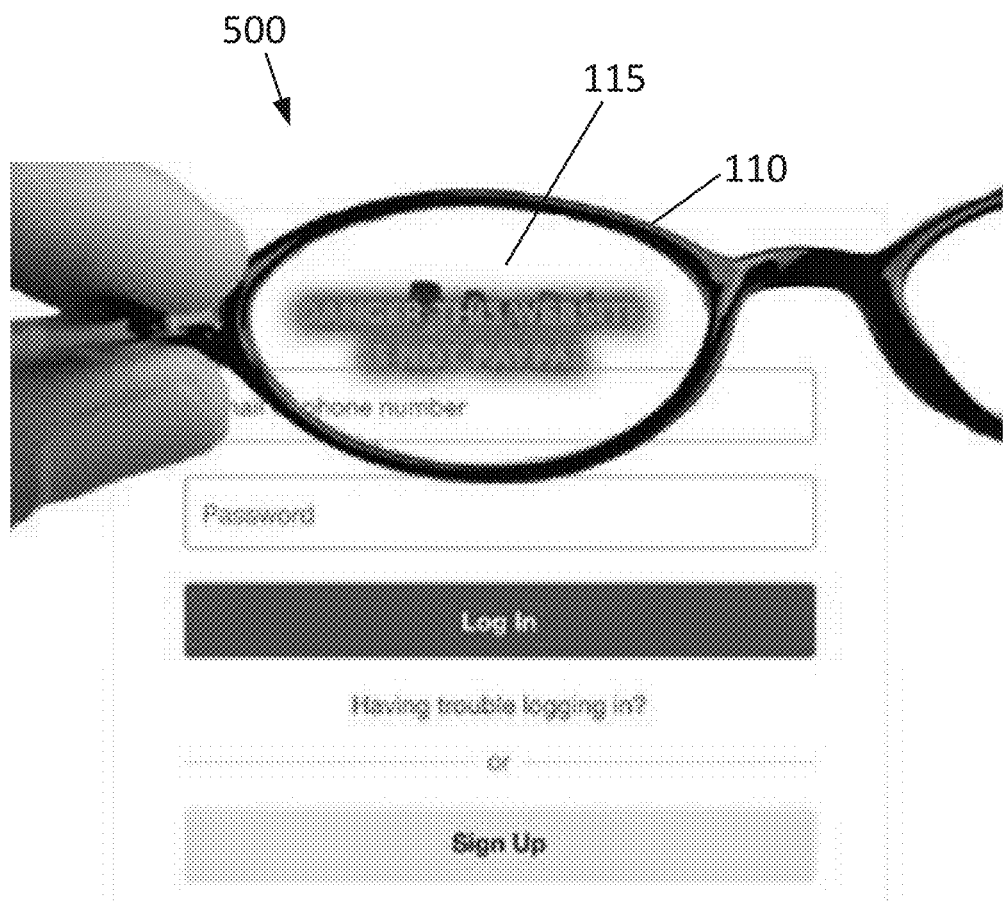
FIG. 11 is an example of a user device interfacing with a webpage with a graphical representation according to an embodiment of the disclosure.

FIG. 11 is an example of a user device interfacing with a webpage with a graphical representation according to an embodiment of the disclosure. FIG. 11 illustrates user device 110 viewing log-in website 500 with user interface 115. In FIG. 11, user device 110 may be an AR device and user interface 115 may be a viewable area of user device 110

(e.g., a lens of an AR glasses), but other embodiments may utilize other electronic devices as described herein. In FIG. 11, user device 110 has determined from the graphical representation that log-in website 500 is not legitimate. Accordingly, user device 110 is outputting an indication through user interface 115 that the website is not legitimate. As shown through user device 110, the indication may be a displayed message, but other devices may output an audible warning or another such warning.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order, hierarchy of steps, or device configuration in the techniques disclosed is an illustration of exemplary approaches. Based upon design preferences, it is understood that the specific order, hierarchy of steps, and/or device configuration in the techniques may be rearranged. Reference to "first," "second," or other numerical identifiers within the disclosure is for identification purposes only unless an explicit hierarchy is referenced.

What is claimed is:

1. A method comprising:
in response to detecting a spoofing activity associated with a first website, modifying, by one or more hardware processors associated with a server device, a graphical representation included in the first website;
subsequent to the modifying, receiving, from a user device based on the user device accessing a second website, an image of the second website;
normalizing, by the one or more hardware processors, pixel values of a portion of the image based on a color palette associated with the second website;
determining, by the one or more hardware processors, whether the second website corresponds to the first website based on comparing the normalized pixel values of the portion of the image against the modified graphical representation; and
communicating, by the one or more hardware processors, data indicating whether the second website corresponds to the first website to the user device.

2. The method of claim 1, wherein the modifying comprises changing a first pixel value of a first pixel of the graphical representation to a second pixel value having a same Pantone shade as the first pixel value.

3. The method of claim 1, wherein the modifying comprises adjusting positions of a first arrangement of pixels of the graphical representation.

4. The method of claim 3, wherein the graphical representation further comprises a fixed reference pixel.

5. The method of claim 1, wherein the modifying comprises moving a position of the graphical representation within the first website.

6. A system comprising:
a non-transitory memory; and
one or more hardware processors coupled to the non-transitory memory and configured to read instructions from the non-transitory memory to cause the system to perform operations comprising:
in response to detecting a spoofing activity associated with a first website, modifying a graphical representation included in the first website;
subsequent to the modifying, obtaining, from a user device based on the user device accessing a second website, an image of the second website;
normalizing pixel values of a portion of the image based on a color palette associated with the second website;
comparing the normalized pixel values of the portion of the image against the modified graphical representation;
determining, based on the comparing, whether the second website corresponds to the first website; and
displaying a notice indicating whether the second website is fraudulent based on the determining whether the second website corresponds to the first website.

7. The system of claim 6, wherein the operations further comprise:
extracting characteristics associated with the graphical representation, wherein the comparing is based on the extracted characteristics.

8. The system of claim 6, wherein the modifying the graphical representation is performed through an Application Programming Interface (API) based program.

9. The system of claim 6, wherein the comparing comprises comparing a first pixel value of a first pixel of the graphical representation to a second pixel value of a second pixel of the portion of the image, and wherein the determining whether the second website corresponds to the first website comprises determining whether the first pixel value matches the second pixel value.

10. The system of claim 9, wherein the graphical representation is modified based on a first pixel offset, and wherein the determining whether the second web site corresponds to the first website comprises determining whether a second pixel offset indicated in the portion of the image corresponds to the first pixel offset.

11. The system of claim 6, wherein the operations further comprise:
identifying a color palette on the second website.

12. The system of claim 6, wherein the comparing comprises executing a cyclic redundancy check (CRC) function and determining a first value based on the executing.

13. The system of claim 12, wherein the operations further comprise:
determining a base value based on the modified graphical representation, wherein the determining whether the second web site corresponds to the first website comprises determining whether the first value matches the base value.

14. The system of claim 6, wherein the obtaining the image of the second website comprises obtaining a Uniform Resource Locator (URL) of the second website within the image, and wherein the determining whether the second website corresponds to the first website is further based on the URL.

15. The system of claim 6, wherein the obtaining the image comprises capturing a screenshot of a display of the second website on an electronic device or photographing the display of the second website using a camera of the electronic device.

16. A non-transitory machine-readable medium having stored thereon machine-readable instructions executable to cause a machine to perform operations comprising:
in response to detecting a spoofing activity associated with a first website, modifying a graphical representation included in the first website;
subsequent to the modifying, accessing an image of a second website;
normalizing pixel values of a portion of the image based on a color palette associated with the second website;
determining whether the second website corresponds to the first website based on comparing the normalized pixel values of the portion of the image against the modified graphical representation; and
communicating data indicating whether the second website corresponds to the first website to the user device.

17. The non-transitory machine-readable medium of claim 16, wherein the operations further comprise:
identifying a second party associated with the second website; and
determining that the second party is authorized to provide a service offered by the first website, wherein the determining whether the second website corresponds to the first website is further based on the determining that the second party is authorized to provide the service.

18. The non-transitory machine-readable medium of claim 16, wherein the second website is accessed based on a user device accessing the second website, and wherein the operations further comprise:
determining that the second website corresponds to the first website; and
in response to determining that the second website corresponds to the first website, presenting the second website on the user device.

19. The non-transitory machine-readable medium of claim 16, wherein the graphical representation comprises an image of the first website.

20. The non-transitory machine-readable medium of claim 16, wherein the image indicates a Uniform Resource Locator (URL) of the second website, and wherein the determining whether the second website corresponds to the first website is further based on the URL.

* * * * *